(12) United States Patent
Jang

(10) Patent No.: US 12,472,332 B2
(45) Date of Patent: Nov. 18, 2025

(54) APPARATUS AND METHOD FOR INACTIVATING INFECTIOUS ORGANISMS IN HUMAN BODY

(71) Applicant: Kyuin Jang, Atchison, KS (US)

(72) Inventor: Kyuin Jang, Atchison, KS (US)

(73) Assignee: CHUNGMED USA, INC., Rockville, MD (US)

( * ) Notice: Subject to any disclaimer, the term of this patent is extended or adjusted under 35 U.S.C. 154(b) by 281 days.

(21) Appl. No.: 18/200,520

(22) Filed: May 22, 2023

(65) Prior Publication Data

US 2023/0285724 A1  Sep. 14, 2023

Related U.S. Application Data

(62) Division of application No. 17/117,161, filed on Dec. 10, 2020, now abandoned.

(51) Int. Cl.
*A61M 31/00* (2006.01)
*A61K 33/20* (2006.01)
*A61M 25/10* (2013.01)

(52) U.S. Cl.
CPC .......... *A61M 25/10* (2013.01); *A61K 33/20* (2013.01); *A61M 31/00* (2013.01); *A61M 2025/1081* (2013.01); *A61M 2202/02* (2013.01); *A61M 2205/3553* (2013.01); *A61M 2205/36* (2013.01); *A61M 2210/1475* (2013.01)

(58) Field of Classification Search
CPC .......... A61K 33/20; A61M 2210/1475; A61M 2025/1081; A61M 2202/02; A61M 31/00; A61M 31/002; A61M 2205/36
See application file for complete search history.

(56) References Cited

U.S. PATENT DOCUMENTS

| 4,732,763 A * | 3/1988 | Beck ................ C12N 11/04 514/963 |
| 10,912,515 B2 * | 2/2021 | Niichel ................ A61B 5/4839 |
| 2011/0052725 A1 * | 3/2011 | Shibata ................ A61P 31/10 424/661 |

* cited by examiner

Primary Examiner — Deanna K Hall
(74) Attorney, Agent, or Firm — Han's Law Office

(57) ABSTRACT

An apparatus and method for inactivating infectious organisms in human body are provided. The apparatus comprises a body having an elongated balloon shape with an open end; a disinfectant containing chlorine dioxide accepted in the body; and an activation module coupled to the body, the activation module includes a case having an opening capable of accommodating the body, an energy supply unit for supplying energy to the disinfectant to activate the chlorine dioxide and a controller for controlling the energy supply unit. The method comprises the steps of inserting the device into a vagina and controlling a degree of activation of the chlorine dioxide to inactive infectious organisms in the vagina by adjusting an intensity of the energy.

10 Claims, 16 Drawing Sheets

APPARATUS AND METHOD FOR INACTIVATING INFECTIOUS ORGANISMS IN HUMAN BODY

CROSS-REFERENCE TO RELATED APPLICATIONS

This application is a divisional of U.S. patent application Ser. No. 17/117,161 filed Dec. 10, 2020, the disclosures of the application is incorporated herein by reference.

TECHNICAL FIELD

This present disclosure relates to an inactivation of germs in a human body, more particularly, to an apparatus (a device) and methods for inactivating infectious organisms, such as viruses and bacteria, and especially for inactivating the human papilloma virus (HPV) in uterus and vagina of a woman.

DESCRIPTION OF THE RELATED ART

In general, vaginal cleanliness has been proposed for female personal hygiene and gynecological health because the vagina may be a suitable place for various infectious organisms to live. In particular, among the infectious organisms inside the vagina, human papillomavirus has been known as a factor causing cervical cancer.

The cervical cancer is one of the prevalent illnesses that women suffer, and the number of deaths from the cervical has been continuously increasing during the past decade. Typically, surgical treatment is performed in the early stage of the cervical cancer, and concurrent chemoradiation therapy is performed when it is progressed to some extent; and in other cases, only systemic chemotherapy is performed.

However, even if the uterus is entirely removed by a surgical resection, human papillomavirus (HPV) may be continuously present in the vagina, causing dysplasia of vaginal cells and further vaginal cancer. Therefore, appropriate treatment devices and treatment methods that safely and effectively inactivates the virus are needed. Also, there is a need for devices and methods that can kill and/or inactivate other infectious organisms inside the vagina.

SUMMARY OF THE INVENTION

In one aspect of the present invention, a device for inactivating infectious organisms in human body comprises a body having an elongated balloon shape, and a circular cross-section with a distal end that is closer to a cervix and a proximal end that is closer to a vaginal opening; a disinfectant containing chlorine dioxide, the disinfectant is in the body; and a withdrawal string attached to the proximal end of the body, wherein the body is made of a gas-permeable material so that the chlorine dioxide penetrates and diffuses through the body as a gas, and is inserted into a vagina.

In another aspect of the present invention, an apparatus for inactivating infectious organisms in human body comprises a body having an elongated balloon shape with an open end; a disinfectant containing chlorine dioxide, the disinfectant that is in the body; and an activation module coupled to the body, wherein the activation module includes a case having an opening capable of accommodating the body, an energy supply unit for supplying energy to the disinfectant to activate the chlorine dioxide and a controller for controlling the energy supply unit.

In another aspect of the present invention, a method for inactivating infectious organisms in human body comprises the steps of: inserting an apparatus comprising a body accommodating a disinfectant that contains chlorine dioxide therein and an activation module including an energy supply unit that supplies energy to the disinfectant to activate the chlorine dioxide into a vagina; and controlling a degree of activation of the chlorine dioxide so as to inactive infectious organisms in the vagina by adjusting an intensity of the energy.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF PREFERRED EMBODIMENTS

Figure 1:
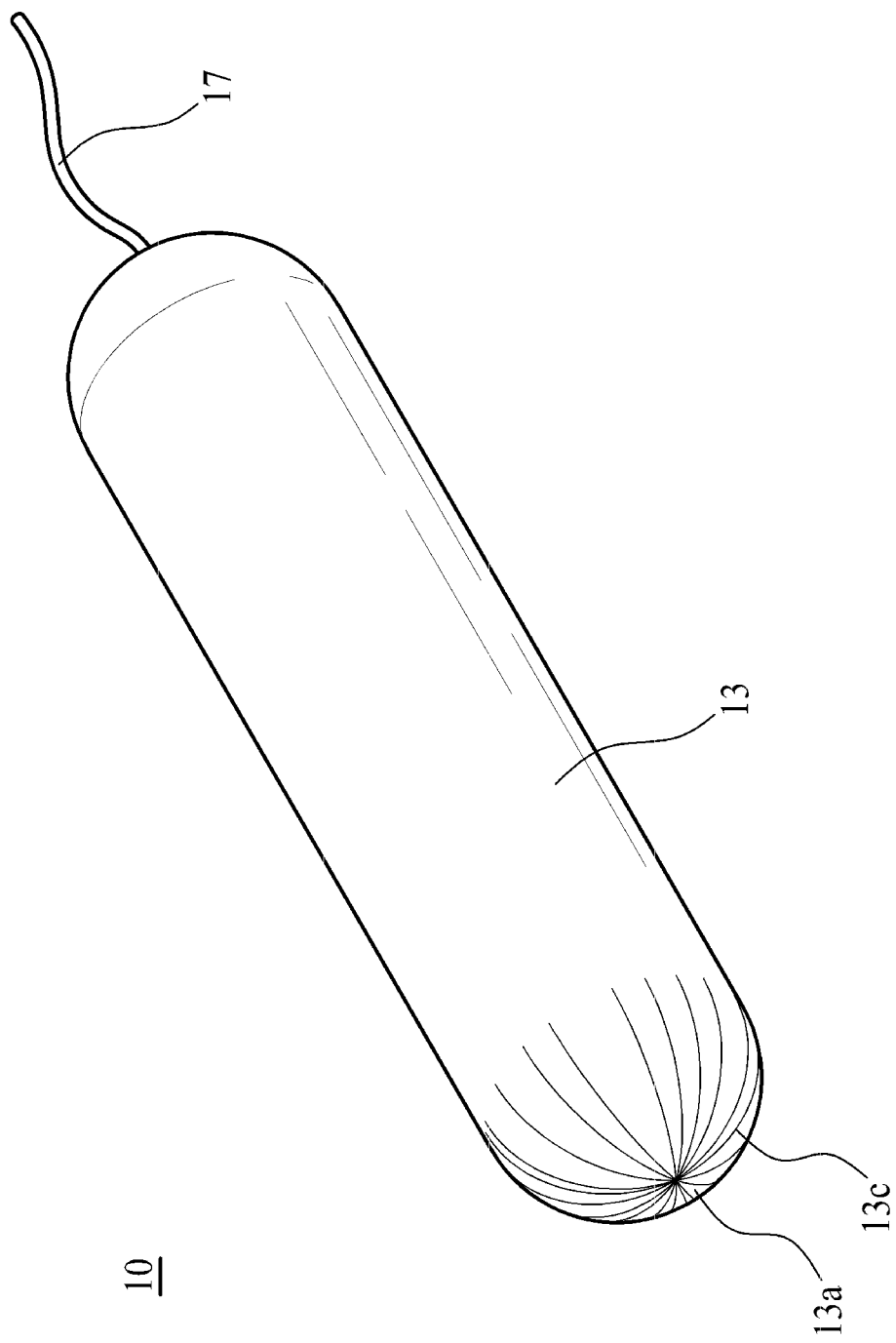
FIG. 1 is a perspective view of a device for inactivating infectious organisms in a human body according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method using the system, the device or the apparatus.

Components shown in the drawings are illustrative of exemplary embodiments of the present invention and are meant to avoid obscuring the invention. Furthermore, connections between components within the figures are not intended to be limited to direct connections. Rather, data between these components may be modified, re-formatted, or otherwise changed by intermediary components or devices. Also, additional or fewer connections may be used. It shall also be noted that the terms "coupled" "connected" or "communicatively coupled" shall be understood to include direct connections, indirect connections through one or more intermediary devices, and wireless and/or wired connections.

Furthermore, by applying relevant technology, one skilled in the art shall recognize: (1) that certain steps may optionally be performed; (2) that steps may not be limited to the specific order set forth herein; (3) that certain steps may be performed in different orders; and (4) certain steps may be done concurrently.

Figure 2:
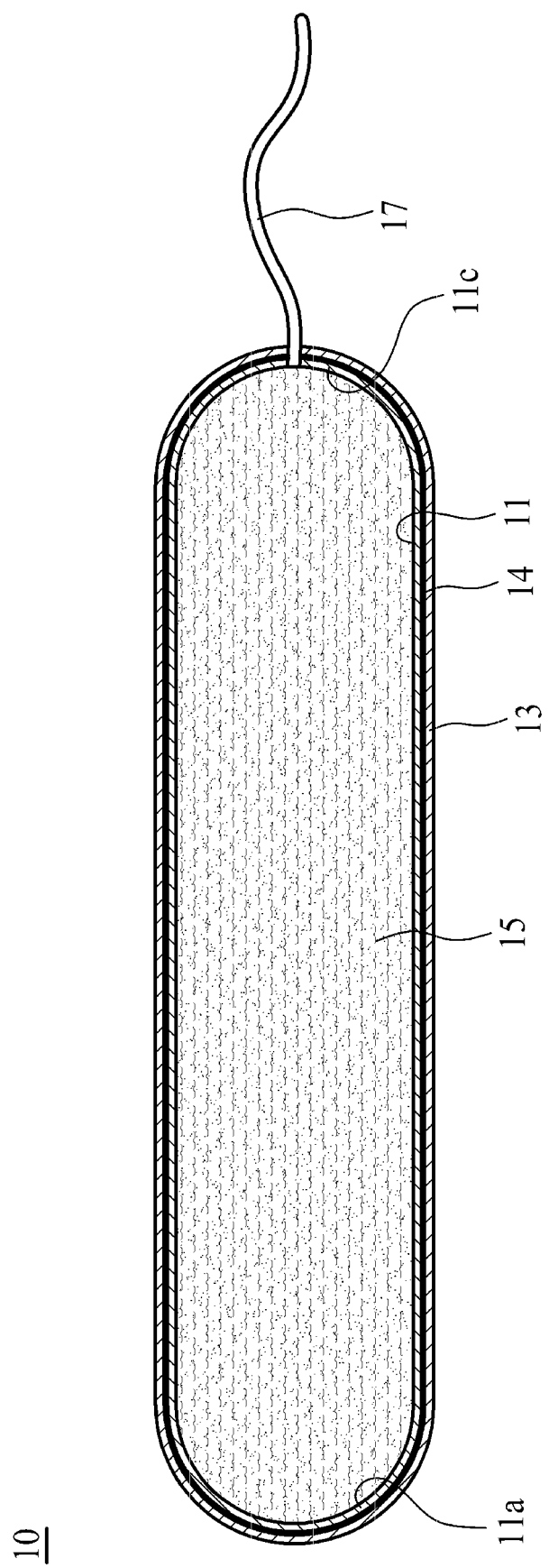
FIG. 2 is a sectional view of the device in FIG. 1.

FIG. 1 is a perspective view of a device for inactivating infectious organisms in a human body according to embodiments of the present disclosure, FIG. 2 is a sectional view of the device in FIG. 1. As depicted, the device 10 may include a body 11, a cover 13, a disinfectant 15 and a withdrawal string 17.

In embodiments, the body 11 may have an elongated balloon shape or a rounded shape as a whole, and a circular cross-section so as to be positioned in a vagina and cervix of a woman. In embodiments, the body 11 may be made of a gas-permeable material so that the disinfectant 15 in the body 11 can pass through the body 11 as a gas. For instance, the gas-permeable material may be at least one of plastics such as polyvinyl chloride and polyethylene; rubbers such as natural rubber latex, carboxylated polyacrylonitrile butadiene, polyurethane, polybutyl rubber, polyisoprene, polychloroprene; thermal plastic elastomers such as styrene-isoprene, styrene-ethylene-butadiene-styrene, styrene-propylene-styrene, styrene-butadiene-styrene or blends thereof. In embodiments, the body 11 may have a distal end 11a that is closer to a cervix and a proximal end 11c that is closer to a vaginal opening when the device 10 is in use. In embodiments, each of the distal end 11a and the proximal end 11c may have a semispherical shape.

In embodiments, the cover 13 may wrap an entire body 11 to prevent contamination of the body 11 by outside sources. In embodiments, the cover 13 may be made of the same material as that of the body 11, and may be more flexible than the body 11 in terms of elasticity. In embodiments, the cover 13 may be made of a dark material to block light. In embodiments, the distal end 13a of the cover 13 may have a plurality of pleats or petals 13c that can be opened radially so that the cover 13 surrounding the body 11 can be peeled off and removed from the body 11 when the device 10 is inserted into the vagina. In embodiments, the pleats can be either even or odd in number and can be equally spaced apart or non-uniformly arranged.

In embodiments, a lubricant 14 harmless to the human body may be disposed between the body 11 and the cover 13. In embodiments, the lubricant 14 may be either water-soluble or water-insoluble, but water-soluble lubricant is preferred for a safe vaginal environment. When the body 11 is inserted into the vagina, the cover 13 wrapping the outer surface of the body 11 is peeled off smoothly by the lubricant 14, to thereby facilitate the body 11 to enter the vagina in a smooth manner.

In embodiments, the disinfectant 15 may contain chlorine dioxide that is known as an efficient disinfecting substance. In embodiments, the disinfectant 15 containing the chlorine dioxide may be in a liquid or a gel state, but is not limited thereto, and may be in other suitable states. It is noted that there are many well-known ways to manufacture or produce the liquid type or the gel type disinfectant that contains chlorine dioxide. The chlorine dioxide is an extremely active oxidant. It almost reacts immediately with anything it is in touch with. Therefore, if the concentration of chlorine dioxide in a disinfectant is too high, the disinfectant needs to be handled by an experienced person with great care. In embodiments, the amount of chlorine dioxide contained in the disinfectant 15 is below a certain limit, as specified by Occupational Safety and Health Administration (OSHA) and the Environmental Protection Agency (EPA), so that the device 10 can be safely operated by any person without knowledge of or experience in handling the chlorine dioxide.

In embodiments, the withdrawal string 17 may be attached to the proximal end 11c of the body 11 so that the body 11 inserted into the vagina can be taken out. In embodiments, the withdrawal string 17 may be made of soft materials such as a plastic or thread, but is not limited thereto. The thread is preferred for environments that can make soft contact with a surface of female genital.

Figure 3A:
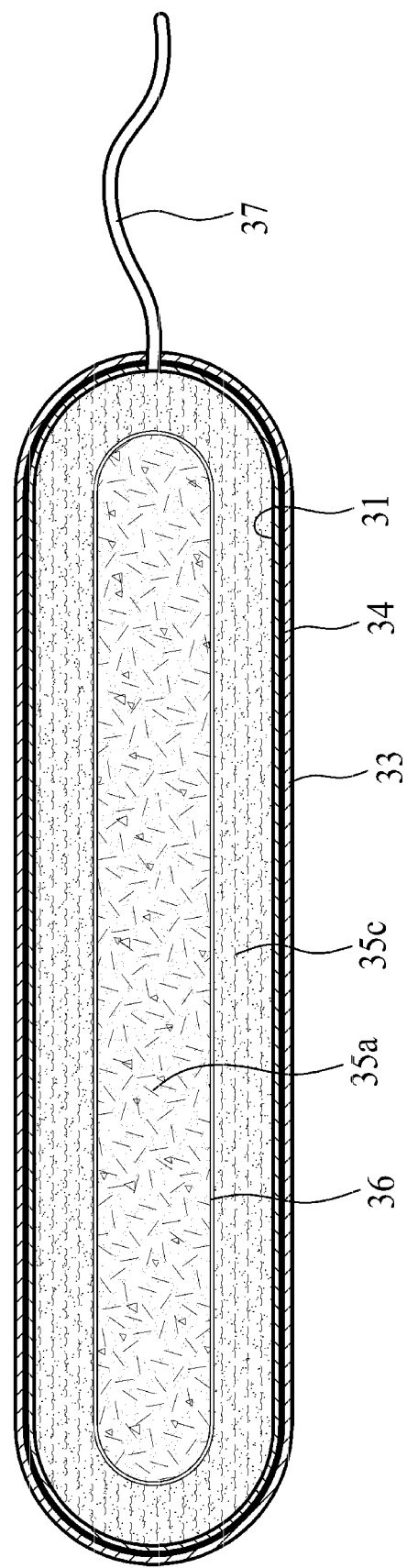
FIG. 3A is a sectional view of a modification of a device for inactivating infectious organisms in a human body according to embodiments of the present disclosure.

FIG. 3A is a sectional view of a modification of a device for inactivating infectious organisms in a human body according to embodiments of the present disclosure.

As depicted in FIG. 3A, the body 31 may include liquid sodium chlorite 35c and a capsule 36 containing a liquid acidic substance 35a therein. Alternatively, in embodiments, the body 31 may include the liquid acidic substance and the capsule contains the liquid sodium chlorite therein. In embodiments, the liquid acidic substance may be a mixture of an acidic group and a solvent such as water, or may include at least one of citric acid ($C_6H_8O_7$), acetic acid ($CH_3COOH$), and lactic acid ($CH_3CHOHCOOH$). Since these acidic substances are weakly acidic, it is apparent to those ordinary skill in the art that they are harmless to the human body and are easy to handle. In embodiments, the cover 33 may be similar to the cover 13 in FIGS. 1 and 2.

Figure 3B:
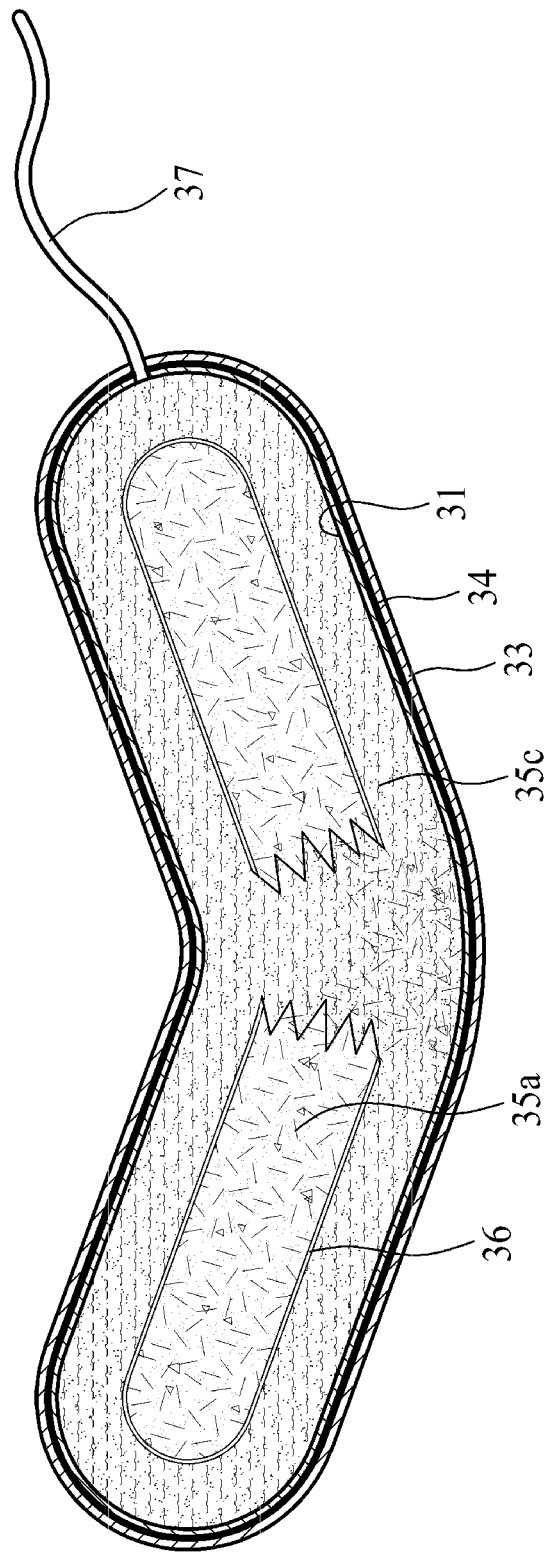
FIG. 3B is a sectional view of the device in FIG. 3A, illustrating a process of generating gaseous chlorine dioxide in the device according to embodiments of the present disclosure.

FIG. 3B is a sectional view of the device in FIG. 3A, illustrating a process of generating gaseous chlorine dioxide in the device according to embodiments of the present disclosure.

As depicted, as the capsule 36 included in the body 31 is broken by the user, the liquid sodium chlorite 35c and the liquid acidic substance 35a are mixed, thereby generating the liquid chlorine dioxide. Then, the device 30 containing the generated liquid chlorine dioxide is inserted into a female vagina. The chlorine dioxide changes from liquid to gas state, penetrates the body 31 and diffuses into the female inner vaginal wall or cervix. In such a case, the mixture ratio of the liquid sodium chlorite and the liquid acidic substance may be controlled so that volume of the diffused chlorine dioxide gas is too low to inflict any harm to the human body but high enough to disinfect the infectious organisms. Thus, the infectious organisms such as bacteria and viruses present in the female vagina are prevented from being activated.

Figure 4:
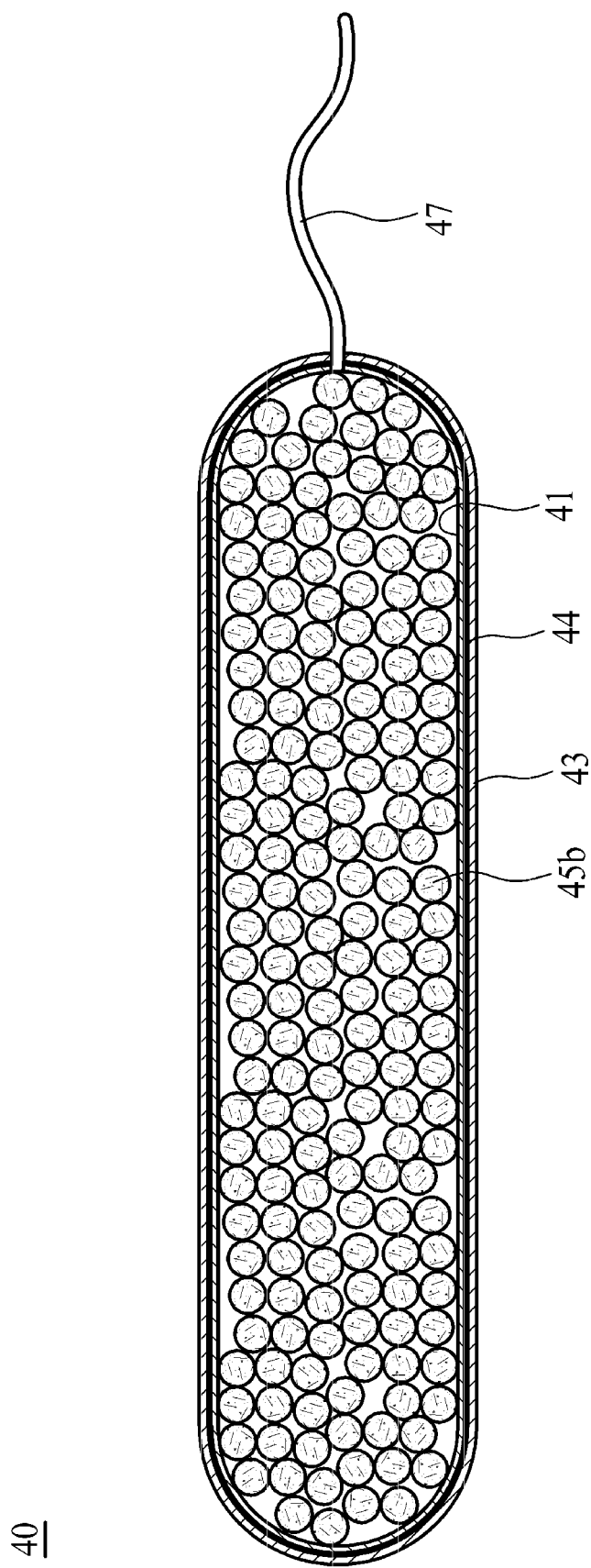
FIG. 4 is a sectional view of another modification of a device for inactivating infectious organisms in a human body according to embodiments of the present disclosure.

FIG. 4 is a sectional view of another modification of a device for inactivating infectious organisms in a human body according to embodiments of the present disclosure.

As depicted, in embodiments, the body 41 may include a plurality of carriers 45b having chlorine dioxide adsorbed therein. The carriers 45b may be formed of a porous material such as silica gel, but not limited thereto. It is apparent to those ordinary skill in the art that any suitable material capable of adsorbing chlorine dioxide may be used as the carrier 45b. In embodiments, the cover 43 may be similar to the cover 13 in FIGS. 1 and 2. Since the cover 43 blocks that the chlorine dioxide is activated by physical energy or chemical energy, the chlorine dioxide absorbed into the carrier 45b is not released until the cover is peeled off and removed from the body 41. When the device 40 including the carriers 45b is inserted into the female vagina, the cover is peeled off from the body 41 and the carriers 45b releases the adsorbed chlorine dioxide, the gaseous chlorine dioxide passes through the body 41 and diffuses into the female inner vaginal wall or cervix. In embodiments, the amount of the chlorine dioxide adsorbed to the porous material may be controlled so that volume of the diffused chlorine dioxide gas is too low to inflict any harm to the human body but high enough to disinfect the infectious organisms.

Figure 5:
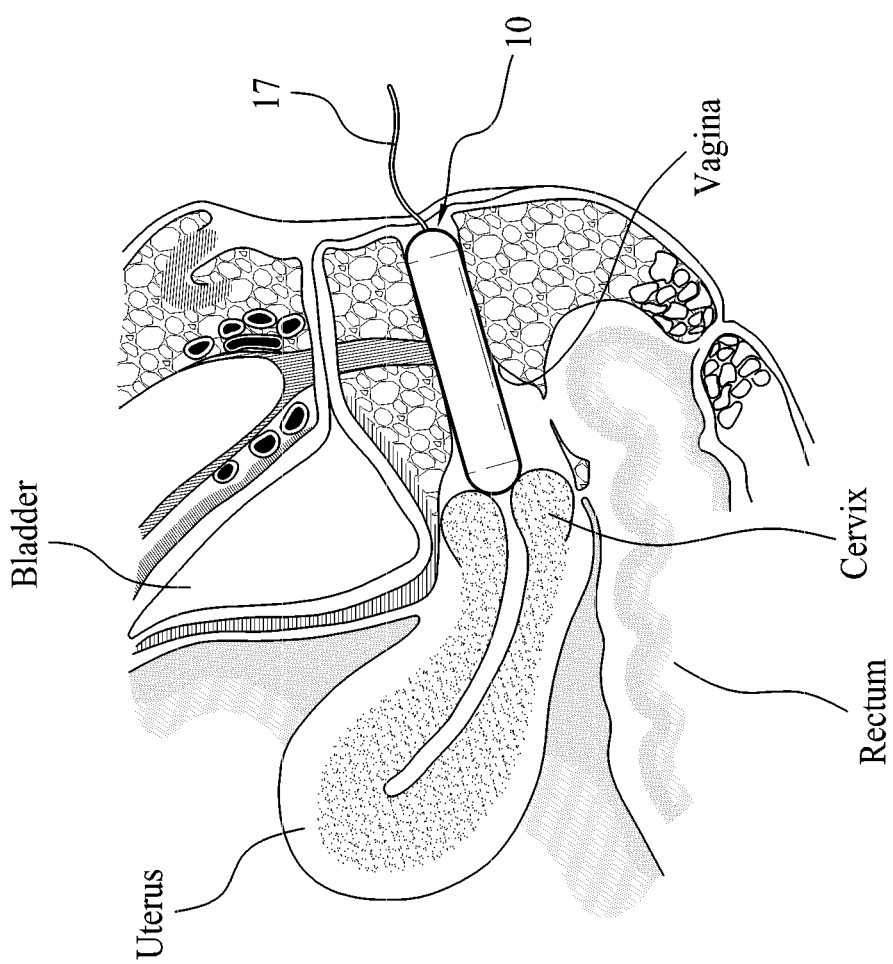
FIG. 5 shows a device for inactivating infectious organisms that is inserted into a vagina according to embodiments of the present disclosure.

FIG. 5 shows a device for inactivating infectious organisms that is inserted into a vagina according to embodiments of the present disclosure within a vagina. In embodiments, the inserted device may be one of the devices described in FIGS. 1-4.

As depicted, when the device 10 is pushed into the vaginal opening with user's hand, the cover 13 surrounding the body 11 is peeled off and removed from the body 11 By doing so, only the body 11 moves from the vaginal opening to the uterus and is positioned in the vaginal canal and the cervix. In this case, the withdrawal string 17 attached to the body is located outside the vagina. As depicted in FIGS. 1 and 2, the round body 11 can facilitate insertion of the device 10 into the vagina or removal of the device 10 from the vagina. In addition, since the body 11 is made of a flexible material, it does not cause discomfort or pain to the patient when inserted into the vagina. In particular, the lubricant between the body 11 and the cover 13 allows the body 11 to be easily inserted into the vagina.

When a certain period of time passes after the body 11 is inserted into the vagina, the chlorine dioxide in the body 11 is activated as gas and passes through the body 11, thereby inhibiting a growth of infectious organisms (e.g. viruses, bacteria, fungi, etc.) or inactivating infectious organisms in the vagina. Thus, it is possible to treat or prevent undesirable conditions such as odor, vaginitis, yeast infections, bacterial infections, viral infections, sexually transmitted disease and the like. Especially, it is noted that the human papilloma virus (HPV), which causes the cervical cancer, can be treated in accordance with the embodiments of the present invention since a vaginal eco-system imbalance caused by microbial organisms causes the vaginal to be receptive to HPV.

Figure 6:
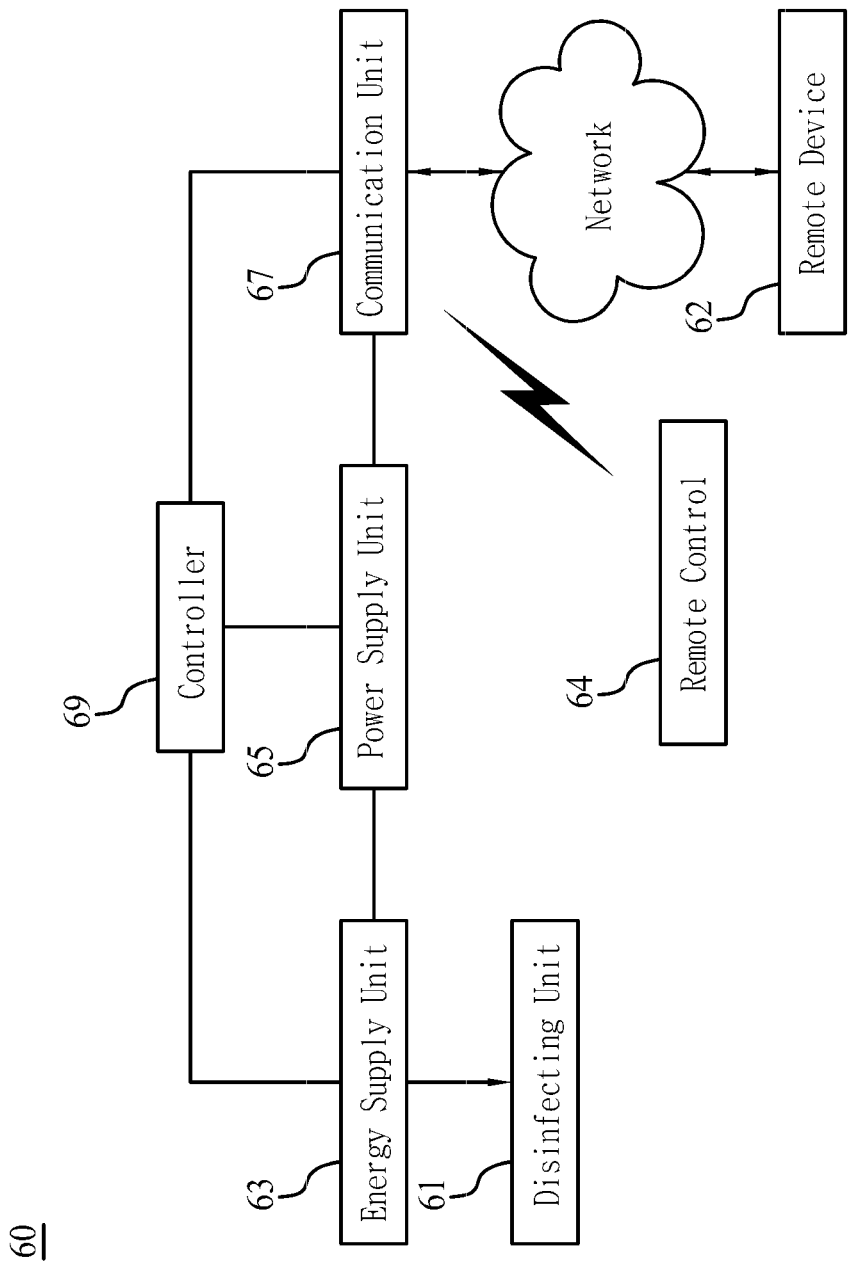
FIG. 6 is a schematic diagram of a system for inactivating infectious organisms in a human body according to embodiments of the present disclosure.

FIG. 6 is a schematic diagram of a system for inactivating infectious organisms in a human body according to embodiments of the present disclosure. As depicted, the system 60 includes a disinfecting unit 61, an energy supply unit 63, a power supply unit 65, a communication unit 67, and a controller 69.

In embodiments, the disinfecting unit 61 may be composed of the body that has a disinfectant as a component inserted into the vagina. In embodiments, the body may be similar to the bodies 11, 31, 41 in FIGS. 1-4. The disinfectant may also include the chlorine dioxide described above, and may be in a liquid or gel form capable of generating gaseous chlorine dioxide.

In embodiments, the energy supply unit 63 may supply energy to the disinfecting unit 61 to activate the chlorine dioxide contained in the body 11. In embodiments, the energy supply unit 63 may include a light source unit or a heat unit to supply light energy or heat energy, respectively. Energy is not limited to physical energy such as light energy or thermal energy, but may include chemical energy capable of activating the chlorine dioxide, for example, moisture, acid, catalyst, and the like.

In embodiments, the power supply unit 65 may be electrically connected to the energy supply unit 63 to supply power to the energy supply unit 63. In embodiments, the energy supply unit 63 supplies chemical energy to the disinfecting unit 61, and the power supply unit 65 may supply power required for the chemical reaction to the energy supply unit 63.

In embodiments, the communication unit 67 may enable the system 60 to connect to the remote device 62 through any one of a variety of networks including the Internet, an Ethernet cloud, an FCoE/DCB cloud, a local area network (LAN), a wide area network (WAN), a storage area network (SAN), or enable the system 60 to connect to a remote control 64 through any suitable electromagnetic carrier signals including infrared signals under the control of a controller 69. In this case, the remote device 62 may be operated by a practitioner such as an obstetrician or gynecologist for a remote medical care and the remote control 64 may be operated by the user in person.

In embodiments, the controller 69 may control components constituting the system 60. In particular, it should be noted that the control unit 69 may control the energy supply unit 63 so that the energy supply unit 63 continuously operates for a predetermined period of time to supply energy to the disinfecting unit 61 or at a time interval to supply energy to the disinfecting unit 61. In embodiments, the controller 69 may include a CPU that may be implemented with a logic microprocessor or the like. In embodiments, the controller 69 may control the energy supply unit 63 to adjust the intensity of energy such as light or heat generated by the energy supply unit 63. In embodiments, the control method of the energy supply unit 63 by the controller 69 may be variously performed in a range in which a gas concentration of the released chlorine dioxide by activating the chlorine dioxide by the energy supply unit 63 is not harmful to the human body.

In this manner, if the energy supply is controlled, the system 60 according to the present invention can more effectively inactivate infectious organisms in the human body (e.g., vagina).

Figure 7A:
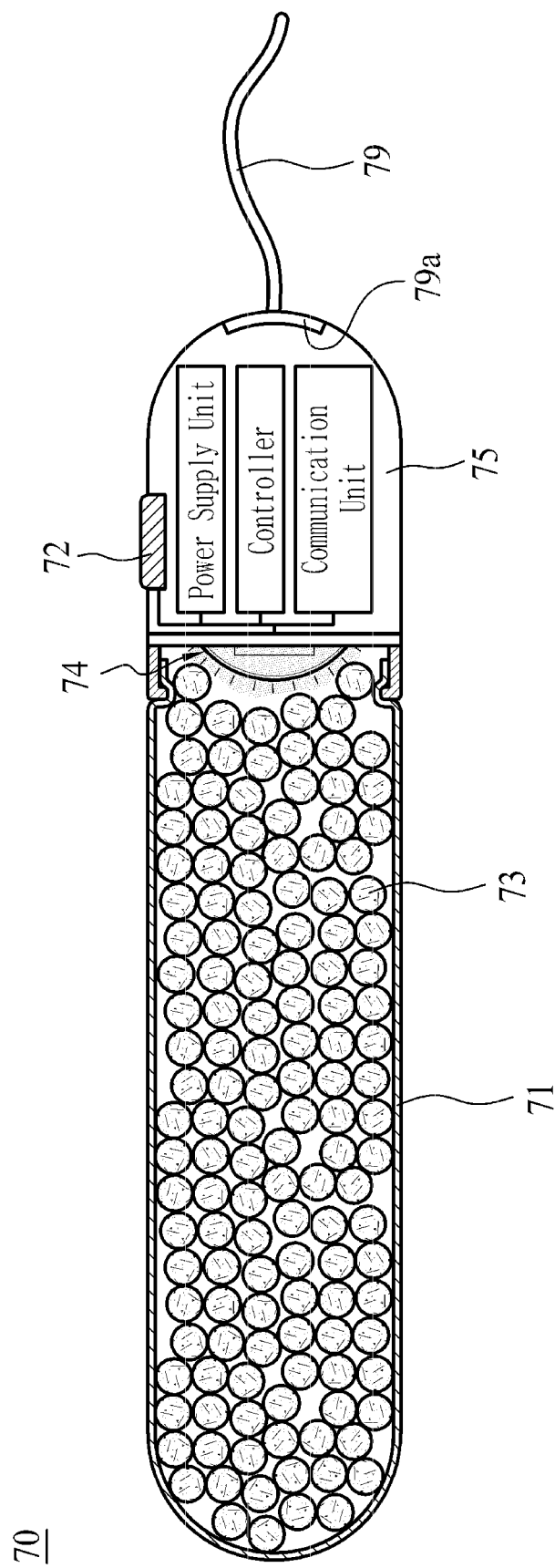
FIG. 7A is a schematic sectional view of an apparatus for inactivating infectious organisms in a human body according to embodiments of the present disclosure.
Figure 7B:
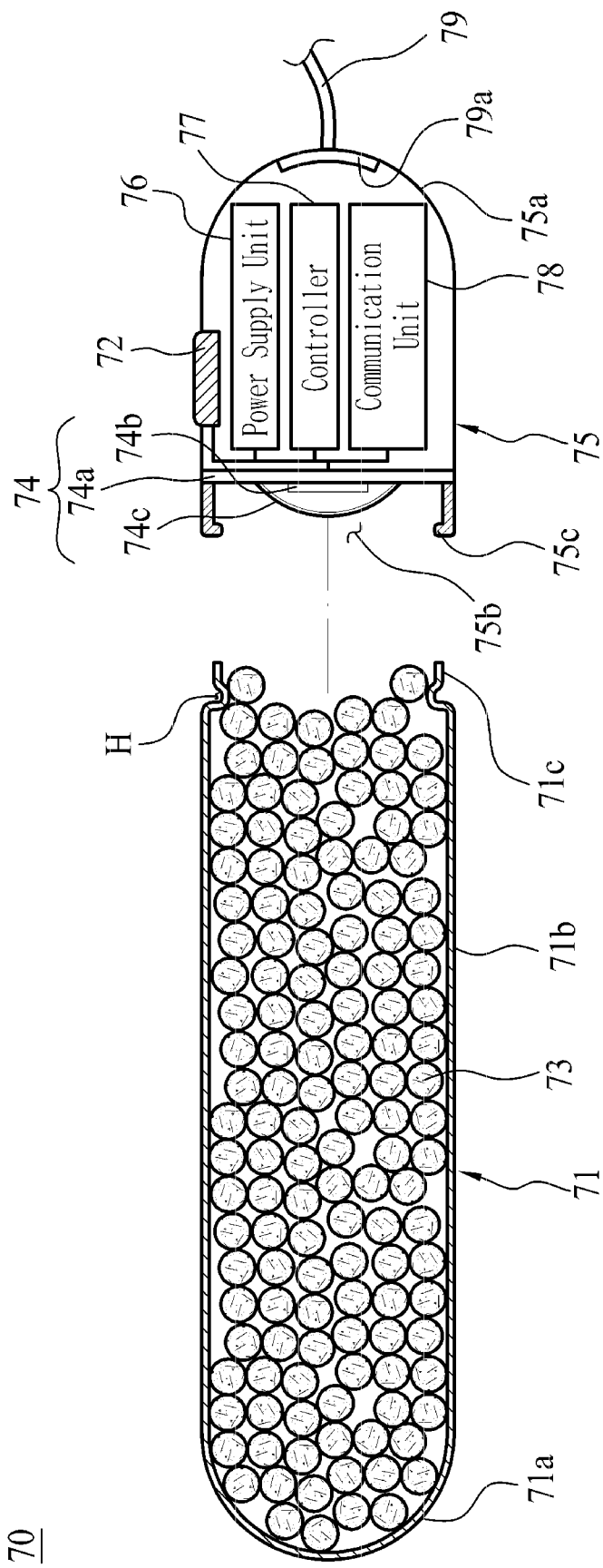
FIG. 7B is an exploded schematic sectional view of the apparatus in FIG. 7A.

FIG. 7A is a schematic sectional view of an apparatus for inactivating infectious organisms in a human body according to embodiments of the present disclosure, FIG. 7B is an exploded schematic sectional view of the apparatus in FIG. 7A. As depicted in FIGS. 7A and 7B, the apparatus 70 may include a body 71, a disinfectant 73, an activation module 75 and a withdrawal string 79.

In embodiments, the body 71 may have an elongated balloon shape. The body 71 may be in the form of a cylinder and can have a blunt rounded or shaped distal and/or proximal end. The body 71 also may include a distal end 71a that is closer to the cervix, a proximal end 71c that is closer to the vaginal opening, and a central portion 71b that is coupled to both the distal end 71a and the proximal end 71c when the apparatus 70 is in use. In embodiments, the distal end 71c may have a hemispherical shape, and the proximal end 71c may be opened to be accepted the disinfectant 73 into the body 71. In embodiments, the proximal end 71c may have a groove H formed on the outer circumferential surface thereof so that the body 71 can be mechanically coupled to the activation module 75 by being inserted into the activation module 75. In embodiments, the outer circumferential surface of the proximal end 71c also may be stepped with respect to the outer circumferential surface of the central portion 71b so that the body 71 can be inserted into the activation module 75. In embodiments, the body 71 may be made of the gas-permeable material as described above.

In embodiments, the disinfectant 73 may contain the chlorine dioxide and may be accepted into the body 71. In embodiments, the disinfectant 73 may include the gel-type chlorine dioxide described in FIG. 4 or the liquid-type chlorine dioxide described in FIGS. 3A and 3B.

In embodiments, the activation module 75 may be mechanically coupled to the body 71, and may include a case 75a, a light source unit 74, a power supply unit 76, a controller 77, and a communication unit 78.

In embodiments, the case 75a may have an opening 75b capable of accommodating the body 71, and include a lip 75c formed on the inner circumferential surface of the opening 75b for mating the groove H of the body 71.

In embodiments, the light source unit 74 may be disposed inside the opening of the case 75a, and include a printed circuit board (PCB) 74a on which a circuit is mounted, a light source 74b that is disposed on the PCB 74a and a diffusion layer 74c that encapsulates the light source 74b and diffuses light generated from the light source 74b toward the body 71. In embodiments, the light source 74b may be preferably, but not limited to, an LED in which intensity of light can be adjusted by the controller 77.

In embodiments, the power supply unit 76 may be electrically connected to the light source unit 74 to supply electrical power (current) to the light source unit 74, and be controlled by the controller 77 to control the operation of the light source unit 74. For instance, the controller 77 may control the power supply unit 76 to cut off electrical power (current) supplied to the light source unit 74 so that light is not generated from the light source unit 74, or control the power supply unit 76 to adjust the intensity of the current supplied to the light source unit 74 so that the intensity of light generated by the light source unit 74 can be adjusted.

In embodiments, the communication unit 78 may be electrically coupled to the controller 77 and communicate with a user's remote device (not shown in FIGS. 7A and 7B) through various networks described above to operate the apparatus 70. Before inserting the apparatus 70 into the human body (e.g., vagina), the user may operate the apparatus 70 by turning on/off a switch 72 that is electrically connected to the components installed in the activation module 75 and disposed on the outer circumferential surface of the case 75a. Then, the user may operate the apparatus 70 using the remote device 62 or the remote controller 64.

In embodiments, the remote device 62 (or the remote controller 64) or switch 72 may transmit an operation signal, for example, a continuous mode signal for continuously operating the apparatus 70 for a predetermined period of time or an intermittent mode signal for operating the apparatus 70 during a time interval, to the communication unit 78.

In embodiments, the withdrawal string 79 may be connected to a hook 79a that is formed on one side of the case 75a.

The apparatus 70 is dimensioned to be carried in the user's handbag or purse, the user may operate the apparatus 70 at any desired time and place allowing the user to effectively kill or inactivate various infectious organisms such as human papilloma virus (HPV) in the her body (e.g., vagina).

It is noted that the apparatus 70 may be reused by refilling the body 71 with new disinfectant 73. In embodiment, the user may disengage the lip 75c from the groove H and replace the used disinfectant 73 with new disinfectant 73. In alternative embodiments, a new body 71 containing a new disinfectant 73 replace the used body and disinfectant.

Figure 8A:
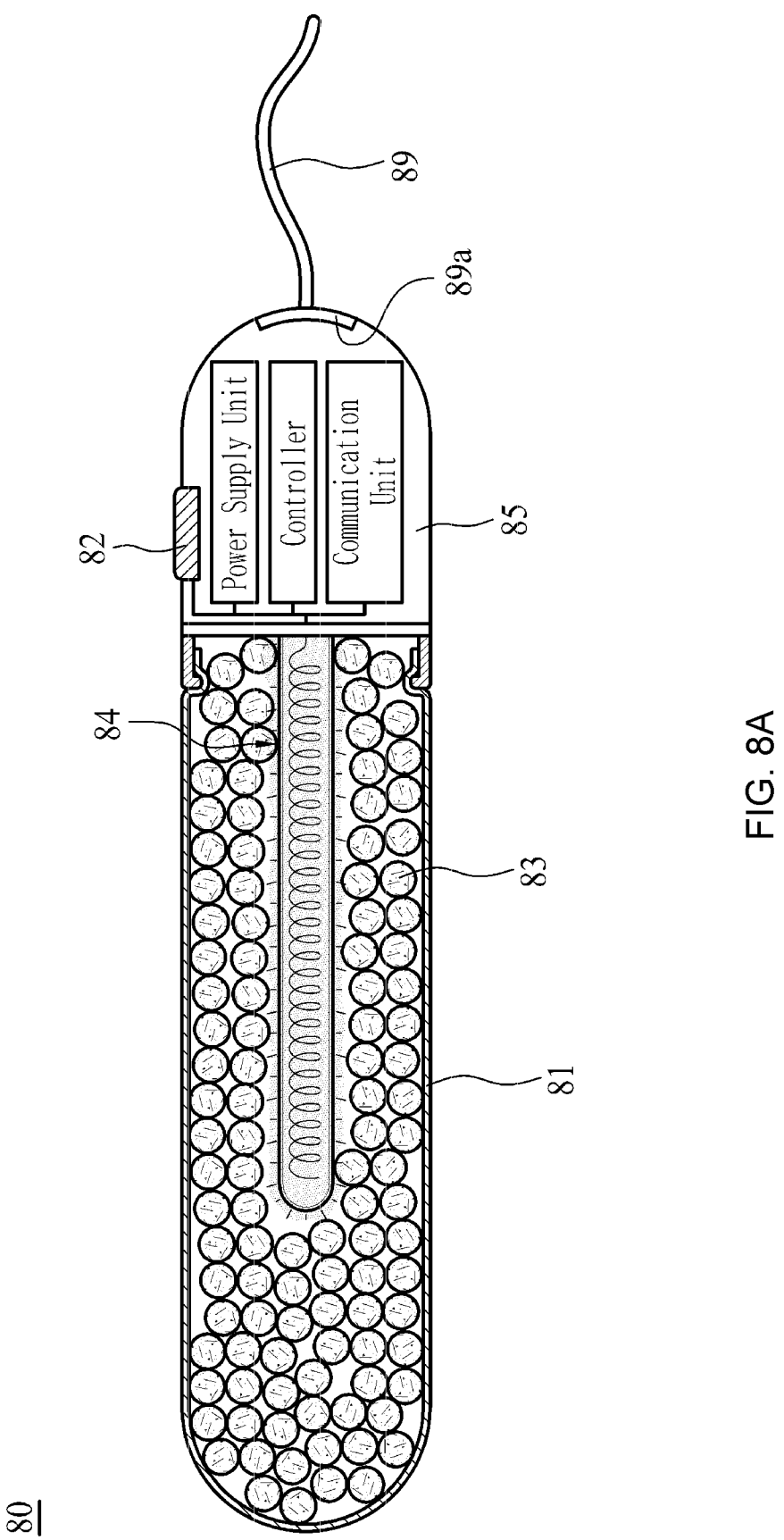
FIG. 8A is a schematic sectional view of another modification of an apparatus for inactivating infectious organisms in a human body according to embodiments of the present disclosure.
Figure 8B:
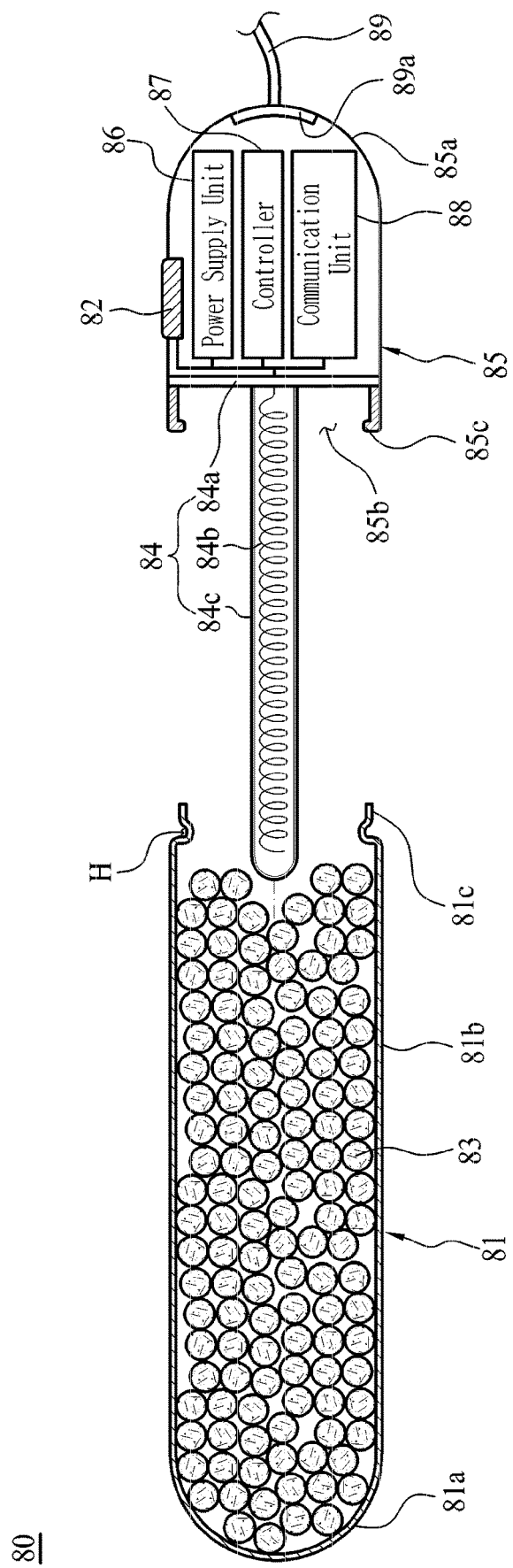
FIG. 8B is an exploded schematic sectional view of the apparatus in FIG. 8A.

FIG. 8A is a schematic sectional view of another modification of an apparatus for inactivating infectious organisms in a human body according to embodiments of the present disclosure, FIG. 8B is an exploded schematic sectional view of the apparatus in FIG. 8A. As depicted, in embodiments, the apparatus 80 may include a body 81, a disinfectant 83, an activation module 85 and a withdrawal string 89. The components 81, 83, 85 and 89 are similar to their counterparts of apparatus 70.

In embodiments, the apparatus 80 according to embodiments of the present invention may include a heat source unit 84 that can transfer heat. In embodiments, the heat source unit 84 may be disposed inside the opening of the case 85a, and include a printed circuit board (PCB) 84a on which a circuit is mounted, a heat source 84b that is disposed on the PCB 84a and a housing 84c that surrounds the heat source 84b. In embodiments, the heat source 84b may be preferably, but not limited to, a heat wire whose temperature can be controlled.

In embodiments, the heat source 84b may protrude from the PCB 84a toward the inside of the body 81 in order to activate the disinfectant 83 in the body 81 by heat generated by the heat source 84b. In embodiments, the housing 84c may be formed to house the heat source 84b, and be made of a material having a high heat transfer coefficient.

Figure 9A:
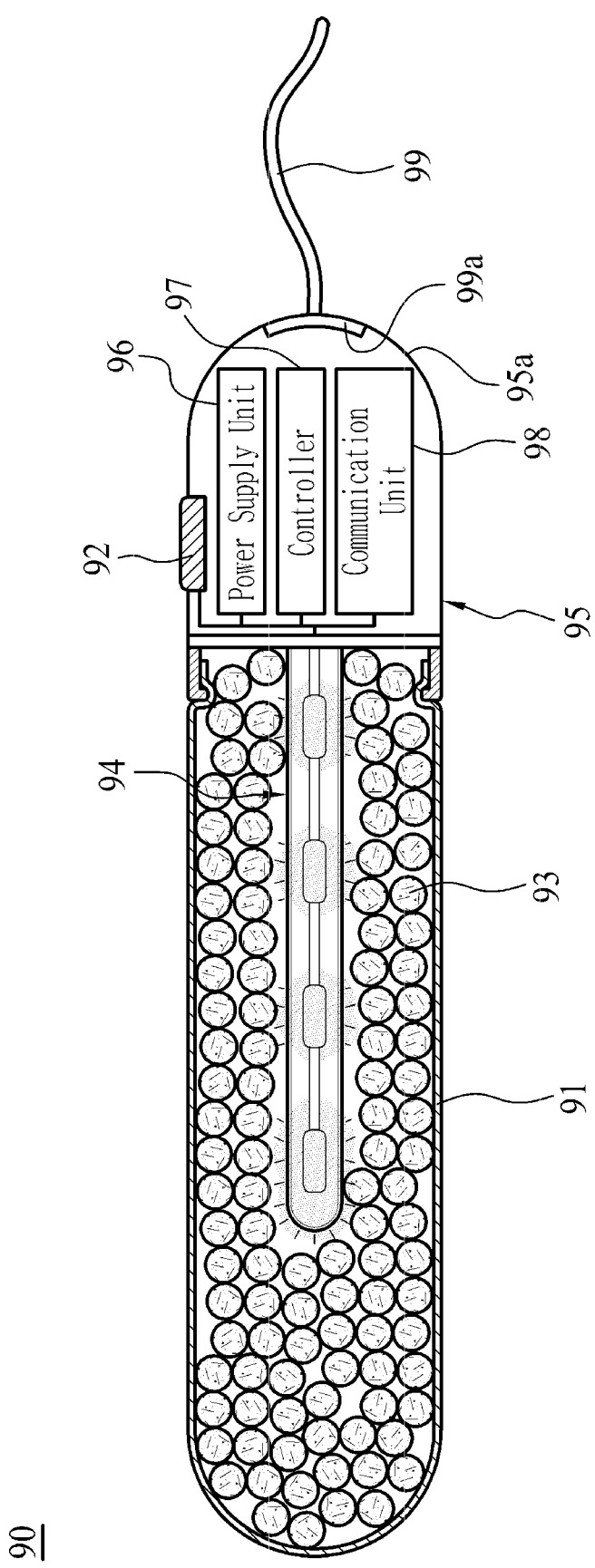
FIG. 9A is a schematic sectional view of a further modification of an apparatus for inactivating infectious organisms in a human body according to embodiments of the present disclosure.
Figure 9B:
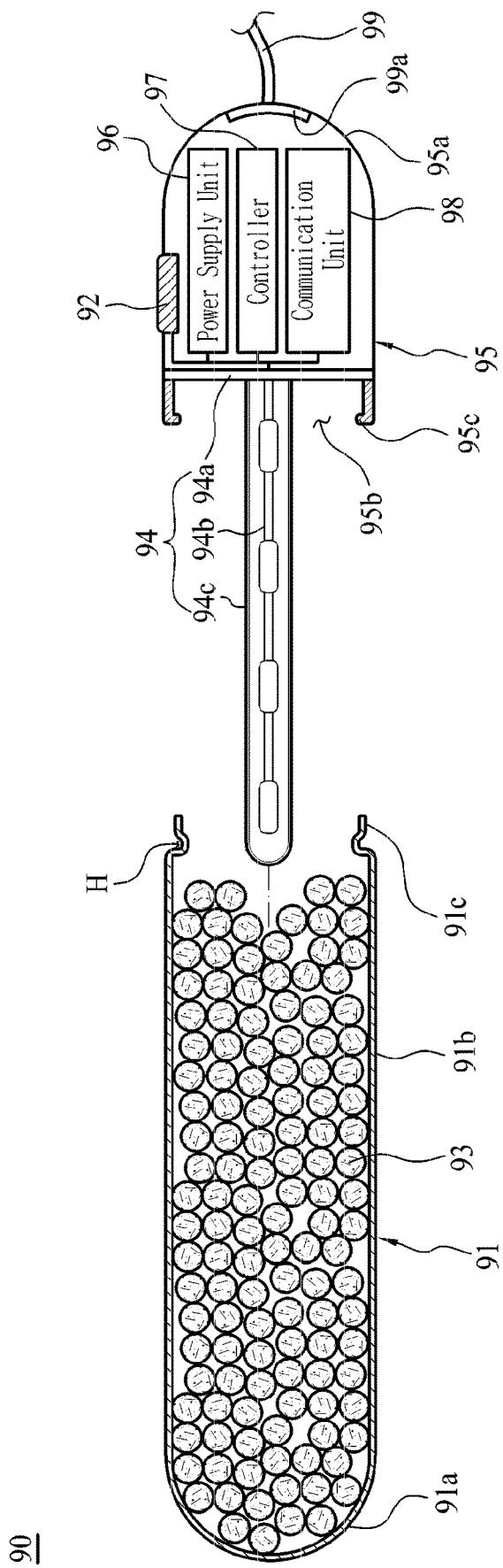
FIG. 9B is an exploded schematic sectional view of the apparatus in FIG. 9A.

FIG. 9A is a schematic sectional view of a further modification of an apparatus for inactivating infectious organisms in a human body according to embodiments of the present disclosure, FIG. 9B is an exploded schematic sectional view of the apparatus in FIG. 9A. As depicted, in embodiments, the apparatus 90 may include a body 91, a disinfectant 93, an activation module 95 and a withdrawal string 99. Components 91, 93, 95 and 99 of the apparatus 90 are similar to their counterparts in FIGS. 7A and 7B.

In embodiments, a light source unit 94 of the apparatus 90 may be disposed inside the opening of the case 95a, and may include a printed circuit board (PCB) 94a on which a circuit is mounted, a light source 94b that is disposed on the PCB 94a and a housing 94c that surrounds the light source 94b. In embodiments, the light source 94b may be preferably, but not limited to, an LED in which intensity of light can be adjusted.

In embodiments, the light source 94*b* may protrude from the PCB 94*a* toward the inside of the body 91 in order to efficiently activate the disinfectant 93 accommodated in the body 91 by the light generated by the light source 94*b*. In embodiments, the housing 94*c* may house the light source 94*b*, and be made of a material that is transparent to the light generated by the light source.

Figure 10B:
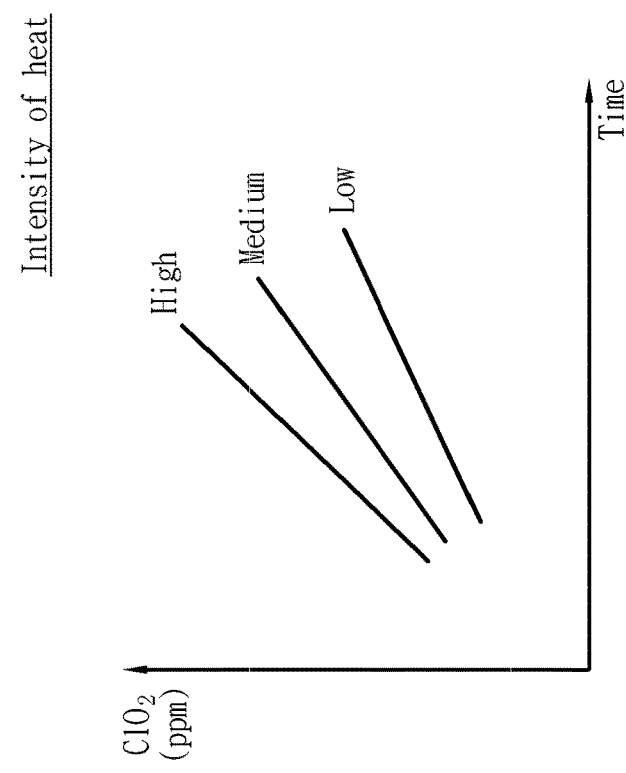
FIG. 10B shows plots of gas concentration of chlorine dioxide as a function of time, depending on the intensity of heat according to embodiments of the present disclosure.
Figure 10A:
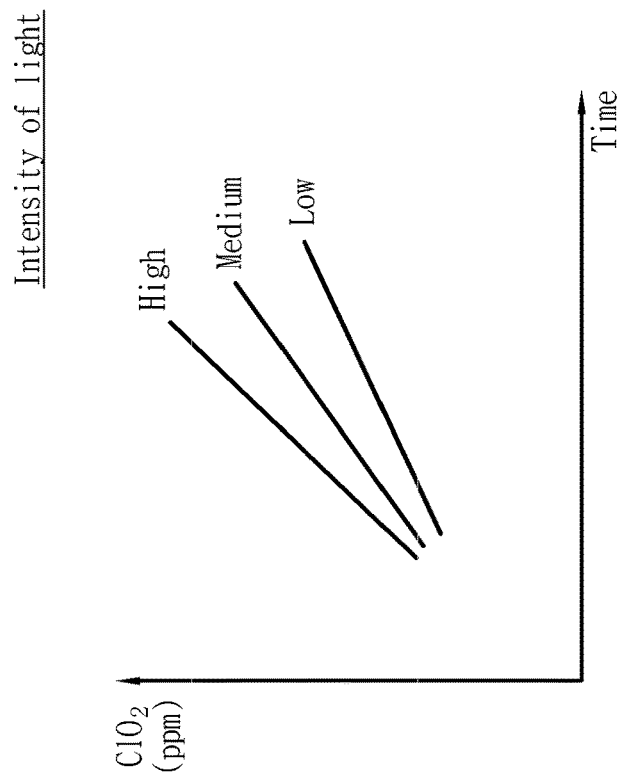
FIG. 10A shows plots of gas concentration of chlorine dioxide as a function of time, depending on the intensity of light according to embodiments of the present disclosure.

FIG. FIG. 10A shows plots of gas concentration of chlorine dioxide as a function of time, depending on the intensity of light according to embodiments of the present disclosure As shown, when the apparatus 70, 90 or system 60 is operated, it is shown that the greater the intensity of light, the higher the gas concentration of chlorine dioxide released over time. That is, it may be concluded that the higher the energy (e.g., light) supplied from the energy supply unit 63 (e.g., the light source unit 74, 94), the higher the gas concentration of chlorine dioxide released from the disinfecting unit 61 (or the disinfectant 73, 93).

FIG. 10B shows plots of gas concentration of chlorine dioxide as a function of time, depending on the intensity of heat according to embodiments of the present disclosure. As shown, when the apparatus 80 or system 60 is operated, it is shown that the greater the intensity of heat, the higher the gas concentration of chlorine dioxide released over time. That is, it may be concluded that the higher the energy (e.g., heat) supplied from the energy supply unit 63 (e.g., the heat source unit 84), the higher the gas concentration of chlorine dioxide released from the disinfecting unit 61 (or the disinfectant 83) by activating the chlorine dioxide.

Figure 10C:
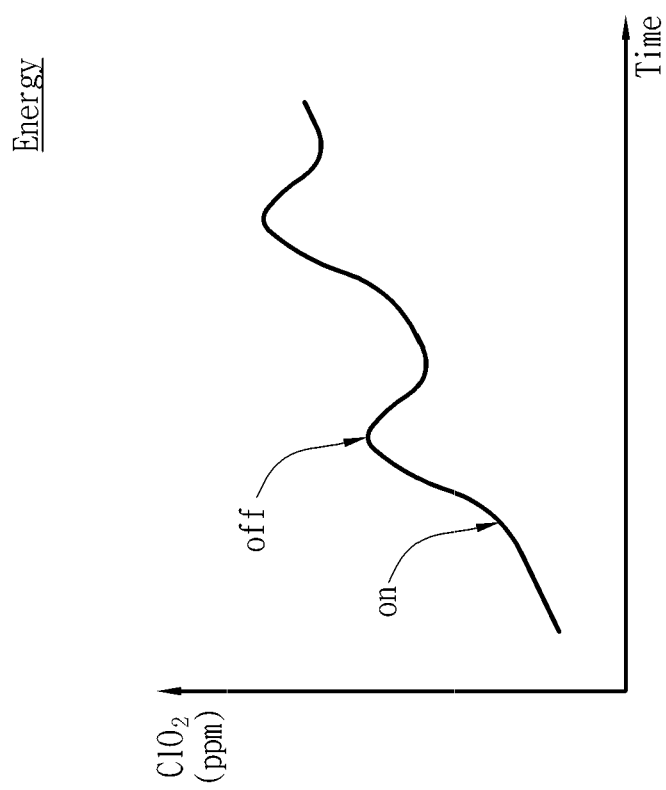
FIG. 10C shows a plot of gas concentration of chlorine dioxide as a function of time, depending on whether or not energy is supplied according to embodiments of the present disclosure.

FIG. 10C shows a plot of gas concentration of chlorine dioxide as a function of time, depending on whether or not energy is supplied according to embodiments of the present disclosure. As shown, when the apparatus 70, 80, 90 or system 60 is operated, it is shown that the gas concentration of chlorine dioxide released from the disinfecting unit 61 (or the disinfectant 73, 83, 93) varies depending on whether the energy supply unit 63 (e.g., the light source unit 74, 94 or the heat source unit 84) is operated or not. That is, when the energy supply unit 63 (e.g., the light source unit 74, 94 or the heat source unit 84) is turned on, the gas concentration of the chlorine dioxide rapidly increases, and when the energy supply unit 63 (e.g., the light source unit 74, 94 or the heat source unit 84) is turned off, the gas concentration of the chlorine dioxide decreases rapidly.

As such, since the apparatus 70, 80, 90 or system 60 can adjust the degree of activation of chlorine dioxide contained in the disinfecting unit 61 (or the disinfectant 73, 83, 93) by controlling the energy supply unit 63 (the light source unit 74, 94 or the heat source unit 84), it can kill or inactivate various infectious organisms such as human papilloma virus (HPV) in the human body (e.g., vagina) without inflicting any harm to the human body.

Figure 11:
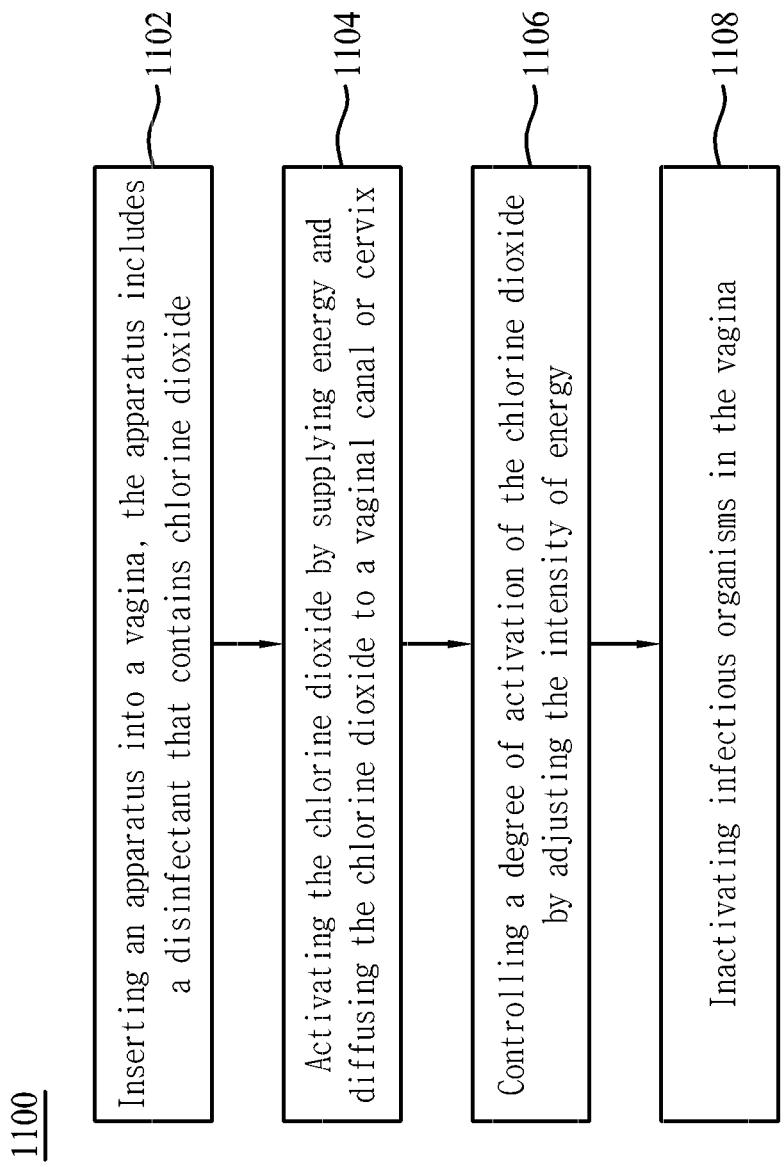
FIG. 11 is a flowchart of an illustrative process for inactivating infectious organisms in a human body according to embodiments of the present disclosure.

FIG. 11 shows a flowchart of an illustrative process for inactivating infectious organisms in a human body according to embodiments of the present disclosure. In embodiments, the steps in the flowchart 1100 may be performed by the user or the components of the system 60 (or the apparatus 70, 80, 90). At step 1102, the user may insert the system 60 (or the apparatus 70, 80, 90) into the vagina. By doing so, the system 60 (or the apparatus 70, 80, 90) is positioned in the vaginal canal and the cervix. In this case, the system 60 (or the apparatus 70, 80, 90) may include the energy supply unit (e.g., the light source unit 74, 94 or the heat source unit 84) that supplies energy to the disinfecting unit 61 (or the disinfectant 73, 83, 93) containing the chlorine dioxide.

Next, at step 1104, the energy supply unit (e.g., the light source unit 74, 94 or the heat source unit 84) may supply energy to the disinfecting unit 61 (or the disinfectant 73, 83, 93), thereby activating the chlorine dioxide and diffusing the chlorine dioxide to the vaginal canal or the cervix. Then, at step 1106, the energy supply unit (e.g., the light source unit 74, 94 or the heat source unit 84) may control the degree of activation of the chlorine dioxide by adjusting the intensity of energy supplied to the disinfecting unit 61 (or the disinfectant 73, 83, 93)

At step 1108, the diffused chlorine dioxide may inactivate the infectious organisms present in the vagina.

In the description, numerous details are set forth for purposes of explanation in order to provide a thorough understanding of the present invention. However, it will be apparent to one skilled in the art that not all of these specific details are required in order to practice the present invention.

Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An apparatus for inactivating infectious organisms in human body, comprising:
   a body having an elongated balloon shape with an open end and a groove at the open end;
   a disinfectant containing chlorine dioxide, the disinfectant is in the body; and
   an activation module coupled to the body, the activation module includes a case having an opening capable of accommodating the body, an energy supply unit for supplying energy to the disinfectant to activate the chlorine dioxide and a controller for controlling the energy supply unit,
   wherein the case of the activation module includes a lip formed to engage or disengage with the groove of the body.

2. The apparatus of claim 1, wherein the activation module further includes a communication unit capable of communicating with user's remote device, and the energy supply unit is operated under a control of the controller based on a signal transmitted from the remote device.

3. The apparatus of claim 1, wherein the energy comprises at least one of light energy and heat energy.

4. The apparatus of claim 1, wherein the energy supply unit includes a light source unit disposed inside the opening of the case, and the controller controls a degree of activation of the chlorine dioxide by adjusting an intensity of light emitted from the light source unit.

5. The apparatus of claim 4, wherein the light source unit includes a substrate, a light source disposed on the substrate, and a diffuser for surrounding the light source and for diffusing light emitted from the light source toward the body.

6. The apparatus of claim 1, wherein the energy supply unit includes a heat source unit disposed inside the opening of the case, and the controller controls a degree of activation of the chlorine dioxide by adjusting an intensity of heat emitted from the heat source unit.

7. The apparatus of claim 6, wherein the heat source unit includes a substrate, a heat source disposed on the substrate and protruding from the substrate into the body, and a housing surrounding the heat source.

8. The apparatus of claim 1, wherein the energy supply unit continuously supplies energy to the disinfectant for a predetermined period or supplies energy to the disinfectant at intervals of time.

9. The apparatus of claim 1, wherein the disinfectant is made of a carrier adsorbed with the chlorine dioxide.

10. The apparatus of claim 1, further comprising:
a withdrawal string attached to one side of the case.

* * * * *